US006035048A

United States Patent [19]

Diethorn

[11] Patent Number: 6,035,048

[45] Date of Patent: Mar. 7, 2000

[54] METHOD AND APPARATUS FOR REDUCING NOISE IN SPEECH AND AUDIO SIGNALS

[75] Inventor: Eric John Diethorn, Morristown, N.J.

[73] Assignee: Lucent Technologies Inc., Murray Hill, N.J.

[21] Appl. No.: 08/877,909

[22] Filed: Jun. 18, 1997

[51] Int. Cl.[7] .......... H04B 15/00

[52] U.S. Cl. .......... 381/94.3; 704/226

[58] Field of Search .......... 381/94.1, 94.2, 381/94.3, 72, 94.5, 94.7, 98, 73.1, 71.1; 704/225, 226

[56] References Cited

U.S. PATENT DOCUMENTS 5,251,263 10/1993 Andrea et al. .......... 381/71.6
5,550,924 8/1996 Helf et al. .

OTHER PUBLICATIONS

R. E. Crochiere and L. R. Rabiner, Multirate Digital Signal Processing, Prentice–Hall, Englewood Cliffs, New Jersey, Jan. 1983, Chapter 7, "Multirate Techniques in Filter Banks and Spectrum Analyzers and Synthesizers," pp. 289–400.

W. Etter and G. S. Moschytz, "Noise Reduction by Noise–Adaptive Spectral Magnitude Expansion," J. Audio Eng. Soc. 42 (May 1994) 341–349.

J. B. Allen, "Short Term Spectral Analysis, Synthesis, and Modification by Discrete Fourier Transform," IEEE Transactions on Acoustics, Speech, and Signal Processing, vol. ASSP–25, No. 3, Jun. 1977.

*Primary Examiner*—Vivian Chang
*Attorney, Agent, or Firm*—Martin I. Finston; Ozer M.N. Teitelbaum

[57] ABSTRACT

A method and apparatus are disclosed for enhancing, within a signal bandwidth, a corrupted audio-frequency signal. The signal which is to be enhanced is analyzed into plural sub-band signals, each occupying a frequency sub-band smaller than the signal bandwidth. A respective signal gain function is applied to each sub-band signal, and the respective sub-band signals are then synthesized into an enhanced signal of the signal bandwidth. The signal gain function is derived, in part, by measuring speech energy and noise energy, and from these determining a relative amount of speech energy, within the corresponding sub-band. In certain embodiments of the invention, the signal gain function is also derived, in part, by determining a relative amount of speech energy within a frequency range greater than, but centered on, the corresponding sub-band. In other embodiments of the invention, the sub-band noise energy is determined from a noise estimate that is updated at periodic intervals, but is not updated if the newest sample of the signal to be enhanced exceeds the current noise estimate by a multiplicative threshold (i.e., a threshold expressible in decibels). In still other embodiments of the invention, the value of the noise estimate is limited by an upper bound that is matched to the dynamic range of the signal to be enhanced.

12 Claims, 4 Drawing Sheets

METHOD AND APPARATUS FOR REDUCING NOISE IN SPEECH AND AUDIO SIGNALS

FIELD OF THE INVENTION

This invention relates to the use of digital filtering techniques to improve the audibility or intelligibility of speech or other audio-frequency signals that are corrupted with noise. More particularly, the invention relates to those techniques that seek to reduce stationary, or slowly varying, background noise.

ART BACKGROUND

It is a matter of daily experience for speech (or other audible information) received over a communication channel to be corrupted with background noise. Such noise may arise, e.g., from circuitry within the communication system, or from environmental conditions at the source of the audible signal. Environmental noise may come, for example, from fans, automobile engines, other vibrating machines, or nearby vehicular traffic. Although noise components that occupy narrow, discrete frequency bands are often advantageously removed by filtering, there are many cases in which this does not provide an adequate solution. Instead, the background noise often exhibits a frequency spectrum that overlaps substantially with the spectrum of the desired signal. In such a case, a narrow frequency-rejection filter may not reject enough of the noise, whereas a broad such filter may unacceptably distort the desired signal.

What is needed in such a case is a filter whose frequency characteristics strike an appropriate balance between rejecting frequency components characteristic of unwanted noise, and preserving the esthetic quality or intelligibility of the desired signal. Among the various audible signals of interest, it is fortuitous that speech, at least, is marked by frequent pauses of sufficient length to be captured and analyzed using digital sampling techniques. Consequently, it is possible to apply different filter characteristics depending whether, according to some criterion, the current signal is more probably speech or more probably noise. (Although the desired signal will often be referred to below as speech, it should be noted that this usage is purely for convenience. Those skilled in the art will readily appreciate that the techniques to be described here apply more generally to audible signals of various kinds.)

Recently, a number of investigators have described approaches to this problem using digital filter banks for sub-band filtering. The filter-bank methods used include, e.g., the DFT (Discrete Fourier Transform) filter-bank method and the polyphase filter-bank method. (As is well-known in the art, these two methods are essentially the same, but differ in certain details of the computational implementation.) Sub-band filtering in general, and in particular the DFT and polyphase filter-bank methods, are described in detail in R. E. Crochiere and L. R. Rabiner, *Multirate Digital Signal Processing,* Prentice-Hall, Englewood Cliffs, N.J., 1983, hereinafter referred to as CROCHIERE, particularly at Chapter 7, "Multirate Techniques in Filter Banks and Spectrum Analyzers and Synthesizers," pages 289–400. I hereby incorporate CROCHIERE by reference.

In a broad sense, these and similar approaches can be described in terms of the processing stages depicted in FIG. 1. A digitally sampled input signal is denoted in the figure by x(i). Here, x typically represents the amplitude of an audio-frequency signal, and i is the time variable, referred to in this digitized form as a time index.

The input data are fed into filter-bank analyzer 10. The output of this analyzer consists of a respective sub-band signal c(0,m), c(1,m), c(2,m), . . . , c(M−1,m) at each of M respective output ports of the analyzer, M a positive integer. (The time index is shown as changed from i to m because the effective sampling rate may differ between the respective processing stages.)

At short-time spectral modifier 20, each of the sub-band signals is subjected to gain modification according to a respective signal gain function g(k,m), k=0,1,2, . . . , M−1, which may differ between respective sub-bands. (In this context, "short-time" refers to a time scale typical of that over which speech utterances evolve. Such a time scale is generally on the order of 20 ms in applications for processing human speech.)

The sub-band signals are recombined at filter-bank synthesizer 30 into modified full-band signal y(i).

One application of methods of this kind to the problem of noise reduction is described in W. Etter and G. S. Moschytz, "Noise Reduction by Noise-Adaptive Spectral Magnitude Expansion," *J. Audio Eng. Soc.* 42 (May 1994) 341–349. This article discusses a signal gain function (for each respective sub-band) that varies inversely according to a power of the fractional contribution made by an estimated noise level to the total signal (i.e., speech plus noise). At relatively high signal-to-noise ratios, this signal gain function assumes a maximum value of unity. The exponent in the power-function relationship is referred to as an expansion factor. An expansion factor controls the rate at which the gain decays as the signal-to-noise ratio decreases.

Although the article by Etter et al. provides useful insights of a general nature, it does not teach how to estimate the noise level or how to discriminate between incidents of speech and background noise that is free of speech. Thus it does not suggest any practical implementation of the ideas discussed there.

Another application of methods of this kind is described in U.S. Pat. No. 5,550,924, "Reduction of Background Noise for Speech Enhancement," issued Aug. 27, 1996 to B. M. Helf and P. L. Chu. This patent describes two methods for estimating the noise level. Both methods involve detecting sequences of input data that satisfy some criterion that signifies the likely presence of background noise without speech. In one method, the processor observes the frequency spectrum of the input data and detects data sequences for which this spectrum is stationary for a relatively long time interval. In the other method, the input stream is divided into ten-second intervals, and within these intervals, the processor observes the energy content of multiple sub-intervals. Within each interval, the processor takes as representative of speech-free background noise that sub-interval having the least energy.

The method of Helf et al. further involves making a binary decision whether speech is present, based on the ratio of input signal to noise estimate. A confidence level is assigned to each of these decisions. These confidence levels determine, in part, the corresponding values of the signal gain function.

Although useful, the method of Helf et al. involves relatively complex procedures for estimating the noise level, establishing the presence of speech, and establishing values for the signal gain function. Complexity is disadvantageous because it increases demands on computational resources, and often leads to greater product costs.

Moreover, it is significant that human speech includes intervals of narrowband, multicomponent energy, referred to as "voiced speech," and intervals of broadband energy, referred to as "unvoiced speech." Methods of sub-band processing, such as those described here, tend to be most effective in detecting voiced speech, because speech detection can take place within the specific frequency sub-bands where speech energy is concentrated. However, such methods are generally less sensitive to incidents of unvoiced speech, because the speech energy is distributed over relatively many frequency bands.

Thus, what has been lacking until now is a sub-band method for enhancing speech (or other audible signals) that is computationally relatively simple, and is at least as effective for detecting unvoiced speech (or other incidents of broadband energy) as it is for detecting voice speech (or other incidents of narrowband, multicomponent energy).

SUMMARY OF THE INVENTION

I have invented an improved sub-band method for enhancing speech or other audible signals in the presence of background noise. My method is computationally relatively simple, and thus can achieve economy in the use of, and demand for, computational resources. In contrast to methods of the prior art, my method includes separate speech-detection stages, one directed primarily to voiced speech or the like, and the other directed primarily to unvoiced speech or the like.

In a broad aspect, my invention involves a method for enhancing, within a signal bandwidth, a corrupted audio-frequency signal having a signal component and a noise component. In accordance with this method, the corrupted signal is analyzed into plural sub-band signals, each occupying a frequency sub-band smaller than the signal bandwidth. A respective signal gain function is applied to the sub-band signal corresponding to each sub-band, thereby to yield respective gain-modified signals. The gain-modified signals are synthesized into an enhanced signal of the signal bandwidth.

Within each frequency sub-band, the step of applying the signal gain function to the sub-band signal includes: evaluating a function that is preferentially sensitive to energy in the signal component; and applying, to the sub-band signal, gain values that are related to the preferentially sensitive function.

In contrast to methods of the prior art, the preferentially sensitive function is evaluated by, inter alia, measuring a relative amount of speech energy within the corresponding sub-band, and also measuring a relative amount of speech energy within a frequency range greater than, but centered on, the corresponding sub-band.

I believe that through the use of my invention, noise in the speech channels of various kinds of telecommunication equipment can be efficiently reduced, and improved subjective audio quality can thereby be efficiently achieved. Such equipment includes telephones such as cellular and cordless telephones, and audio and video teleconferencing systems. Further, my invention can be used to improve the quality of digitally encoded speech by reducing background noise that would otherwise perturb the speech coder. Still further, I believe that my invention can be usefully employed within the switching system of a telephone network to condition speech signals that have been degraded by noisy line conditions, or by background noise that is input at the location of one or more of the parties to a telephone call.

DETAILED DESCRIPTION OF A PREFERRED EMBODIMENT

In the following discussion, the signal x(i) that is to be enhanced is referred to for convenience as "noisy speech," although not only speech, but also other audible signals are advantageously enhanced according to the present invention.

Figure 2:
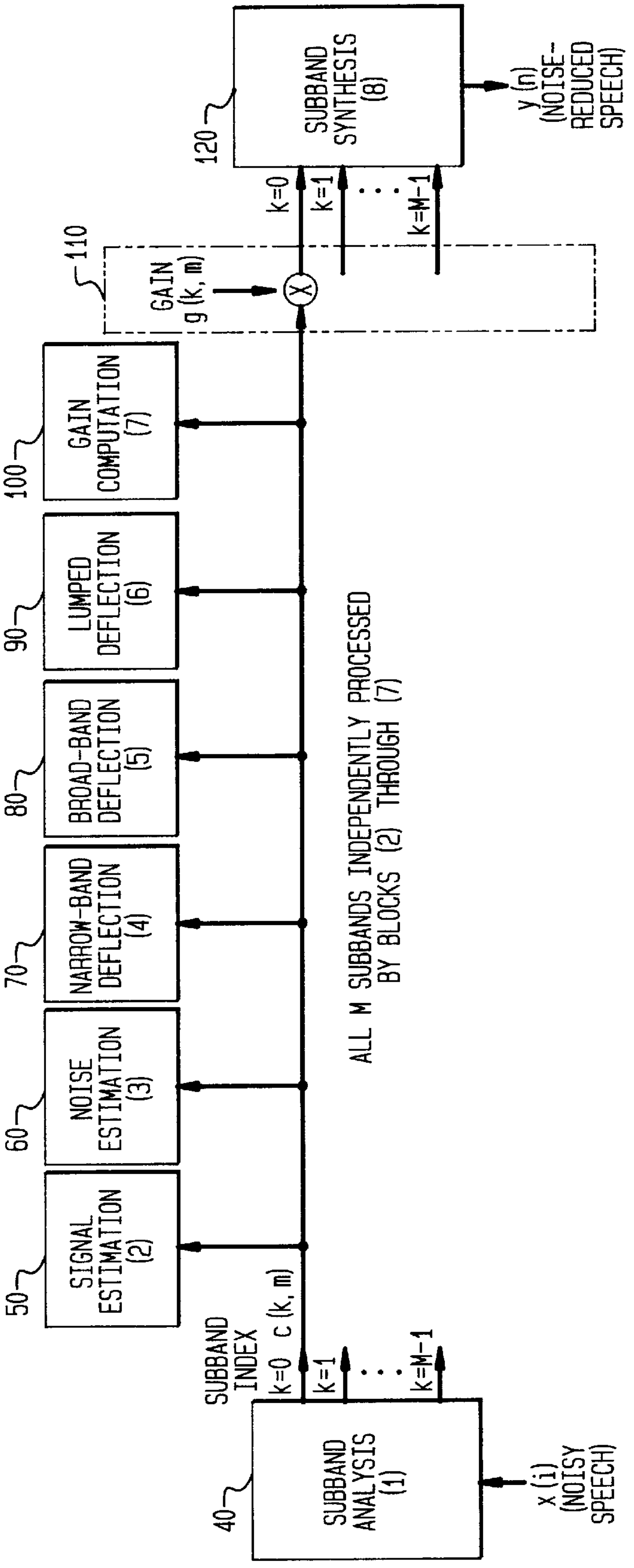
FIG. 2 is a high-level, schematic diagram showing signal flow through various processing stages of the invention in an exemplary embodiment.

As shown in FIG. 2, the noisy speech x(i) is analyzed at block 40 into M sub-band time series c(k,m), k=0,1, . . . , M−1. At block 50, a signal estimate s(k,m) is calculated for each sub-band. As will be seen, this signal estimate is a short-term average of the sub-band time series. When speech is present, s(k,m) estimates the signal level corresponding to the speech.

At block 60, a noise estimate n(k,m) is calculated for each sub-band. As will be seen, this noise estimate is a long-term average of the sub-band time series. It estimates the stationary component of the corrupted input signal, which is assumed to correspond to background noise.

At block 70, a narrowband deflection d(k,m) is calculated for each sub-band. This is one of two deflections to be calculated. Each of these deflections is a time series derived from the signal and noise estimates. The narrowband deflection is derived from the sub-band signal and noise estimates, so as to be particularly sensitive to, e.g., the energy in voiced speech.

At block 80, a broadband deflection D(k,m) is calculated for each sub-band. This second deflection is derived from the sub-band noise estimate and from an average over plural sub-bands of the respective sub-band signal estimates, so as to be particularly sensitive to, e.g., the energy in unvoiced speech.

At block 90, a lumped deflection PHI(k,m) is calculated from the narrowband and broadband deflections. Roughly speaking, the lumped deflection indicates the presence of speech when speech is indicated by either the narrowband or broadband deflection. In addition, an expansion factor p is used to tailor the sensitivity of PHI to the respective deflections.

At block 100, a respective sub-band gain g(k,m) is applied to each of the sub-band time series c(k,m). Typically, this sub-band gain has an upper bound of unity. This upper bound is attained when speech is likely to be present. At other times, the gain assumes values less than one. The expansion factor p affects the rate at which this gain decays as the incidence of speech becomes less likely. Significantly, this gain is calculated as a time series, as shown in the notation used herein by the functional dependence on the time index m.

At block 110, each sub-band time series c(k,m) is modified by its corresponding sub-band gain g(k,m).

At block 120, the modified sub-band time series are synthesized to form modified, full-band output signal y(n), also referred to herein as "noise-reduced speech."

Each of the processing stages discussed above is described in greater detail below, with reference to the pertinent figure. Each of these processing stages is conveniently carried out by a general-purpose digital computer, such as a desktop personal computer, under the control of an appropriate stored program or programs. Equivalently, some or all of these stages can be carried out using special-purpose electronic signal-processing circuits.

Figure 1:
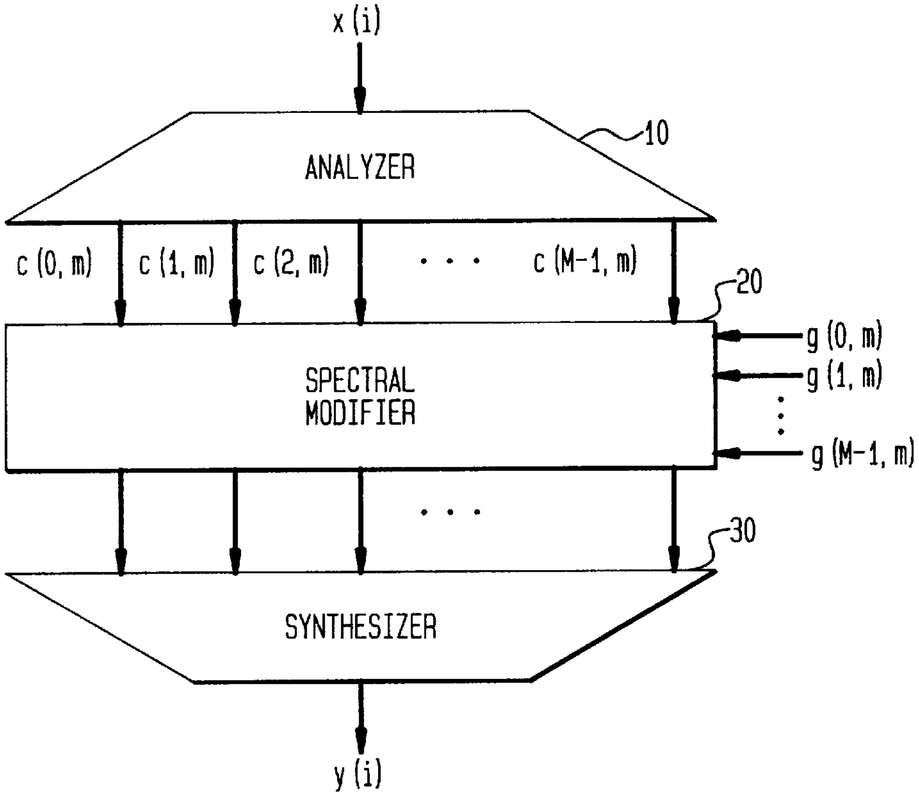
FIG. 1 (PRIOR ART)
FIG. 1 is a schematic drawing that represents, in generic fashion, sub-band methods of speech enhancement, including those of the prior art.

Our currently preferred sub-band analysis technique is based on a perfect reconstruction filter bank using the discrete Fourier transform (DFT) filter bank method. This method is well-known in the art, and described in detail in, e.g., CROCHIERE. Accordingly, this method need not be described in detail here. However, referring back to FIG. 1, it should be noted that perfect reconstruction filter banks have the property that when spectral modifier 20 applies the identity function (i.e., unity gain across all sub-bands), the output of synthesizer 30 is identical to the input to analyzer 10 (within the accuracy of the digital computation).

Figure 3:
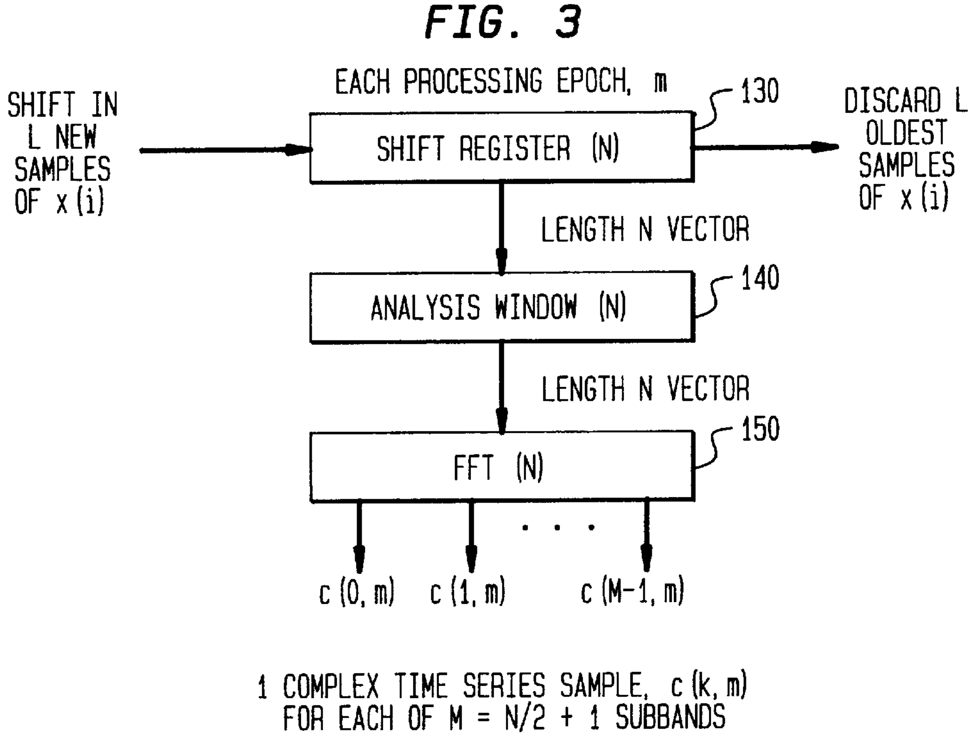
FIG. 3 is a more detailed, schematic representation of the sub-band analysis stage of FIG. 2.

As shown in FIG. 3, the operations of the sub-band analysis stage can be described in terms of accumulator 130, analysis window 140, and Fast Fourier Transform (FFT) 150. Time-series samples are processed in blocks of L samples, where L is an integer. The term "epoch" is used to denote the action of processing one such block. Thus, at the beginning of each processing epoch, a data block consisting of L new time-series samples x(i) is shifted into accumulator 130, which is exemplarily a shift register. The total length of this accumulator is N samples, wherein N is the size of the Fourier transform, and N>L. Those skilled in the art of digital filtering will appreciate that the number M of unique complex sub-bands is related to the size of the Fourier transform according to the formula:

$$M=(N/2)+1.$$

By way of illustration, our current implementation, sampling at a rate of 8 kHz, has 33 unique sub-bands spanning the frequency range 0–4000 Hz.

When L new samples are shifted into the accumulator, the L oldest samples are shifted out. In our current implementation, the value of L is 16 and the value of N is 64. These values are illustrative, and not essential to the practice of the invention.

The N-vector of accumulated samples is multiplied by analysis window 140, which is a window of length N. Analysis windows are well-known in the digital filtering arts, and discussed at length in, e.g., CROCHIERE. Thus, they need not be described here in detail. Briefly, an analysis window is a function that embodies the frequency-selective properties of a digital filter, and conditions the sampled data to avoid a by-product of digital processing known as frequency aliasing. Frequency aliasing is undesirable because it can lead to distracting audible artifacts in the reconstructed, processed signal.

The N-vector of windowed data is then subjected to N-point FFT 150. As noted, this transform is effectuated, in our current implementation, using the DFT algorithm. Each frequency bin output from the DFT represents one new complex time-series sample for the sub-band frequency range corresponding to that bin. The bandwidth of each bin, or sub-band time series, is given by the ratio of sampling frequency to transform length.

Figure 4:
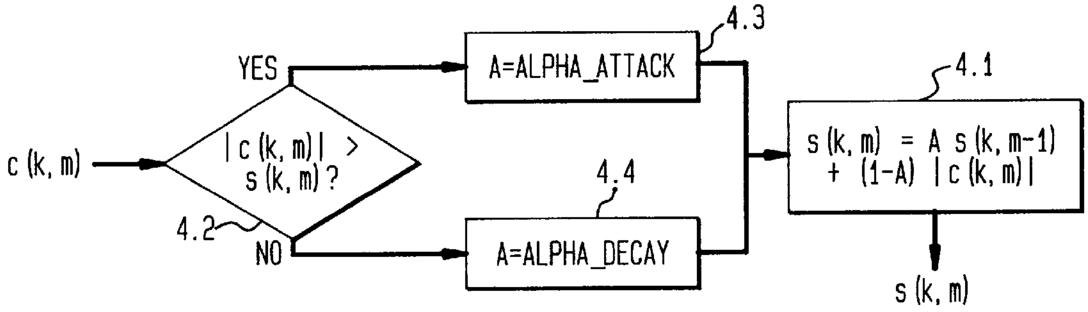
FIG. 4 is a more detailed, schematic representation of the signal-estimation stage of FIG. 2.

As shown graphically in FIG. 4, the signal estimate s(k,m) in each sub-band is computed (block 4.1) using the following non-linear single-pole recursion:

$$s(k,m)=A\ s(k,m-1)+(1-A)|c(k,m)|.$$

The value of the coefficient A is determined by a test (block 4.2) of whether the magnitude of the new data sample c(k,m) is greater, or not greater, than the current value of the signal estimate. Depending on the outcome of this test, A assumes (blocks 4.3, 4.4) one of two alternative values, namely an "attack" value A_ATTACK and a "decay" value A_DECAY, respectively. In our current implementation, a useful range for A_ATTACK is 1–10 ms, and a useful range for A_DECAY is 20–50 ms. These specific values are illustrative and not essential to the practice of the invention.

Figure 5:
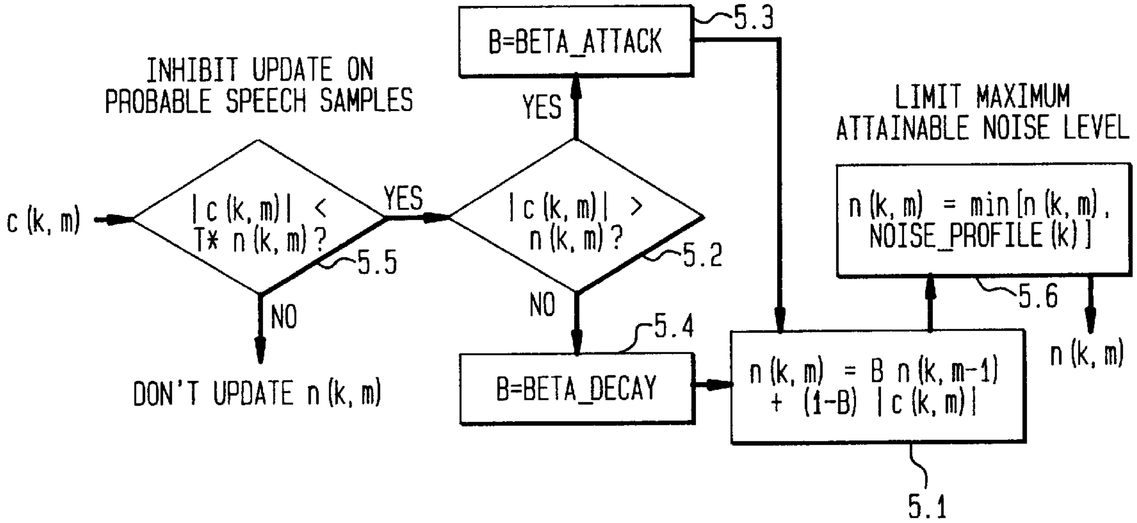
FIG. 5 is a more detailed, schematic representation of the noise-estimation stage of FIG. 2.

As shown graphically in FIG. 5, the noise estimate n(k,m) in each sub-band is computed (block 5.1) using the following non-linear single-pole recursion:

$$n(k,m)=B\ n(k,m-1)+(1-B)|c(k,m)|.$$

The value of the coefficient B is determined by a test (block 5.2) of whether the magnitude of the new data sample c(k,m) is greater, or not greater, than the current value of the noise estimate. Depending on the outcome of this test, B assumes (blocks 5.3, 5.4) one of two alternative values, namely an "attack" value B_ATTACK and a "decay" value B_DECAY, respectively. In our current implementation, a useful range for B_ATTACK is 1–10 seconds, and a useful range for B_DECAY is 1–50 ms. These values are illustrative and not essential to the practice of the invention.

As also shown in FIG. 5, the updating of the noise estimate is advantageously conditioned on a test (block 5.5) of whether the magnitude of the new data sample c(k,m) is less than the current value of the noise estimate, times a multiplier T. By way of illustration, our current implementation has T=20. This prevents an update of the noise estimate if the new data sample exceeds the current value of the noise estimate by 26 dB. This condition prevents the noise estimate from being unduly biased (upward) by samples whose magnitudes are high enough that they assuredly represent speech or other non-stationary signal energy. I have found that this condition significantly improves the stability of the noise estimate for extended speech utterances.

As also shown in FIG. 5, it is advantageous, in at least some cases, to impose (block 5.6) an upper bound, denoted NOISE_PROFILE(k), on the noise estimate in each sub-band. NOISE_PROFILE(k) is advantageously matched to the dynamic range of the corrupted signal to be enhanced. The practical effect of this upper bound is to automatically inhibit the enhancement process in abnormally noisy environments. Such inhibition is useful for preventing speech-processing artifacts that often arise in such environments and that are perceived as unacceptable distortion.

It should be noted that whereas other forms can be used for the signal and noise estimates, the non-linear single-pole recursion relations discussed above for the signal and noise estimates are advantageous because they are computationally simple. Moreover, they have the desirable property of adapting to changes in the character and absolute level of the noise and signal processes. Indeed, practitioners have recognized this and have widely used these relations in various voice-processing applications.

Figure 6:
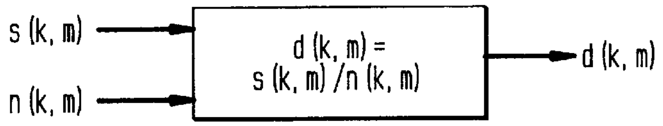
FIG. 6 is a more detailed, schematic representation of the narrowband deflection stage of FIG. 2.

As shown in FIG. 6, the narrowband deflection is obtained as the ratio of the sub-band signal estimate to the sub-band noise estimate. That is, $$d(k,m)=s(k,m)/n(k,m).$$

Figure 7:
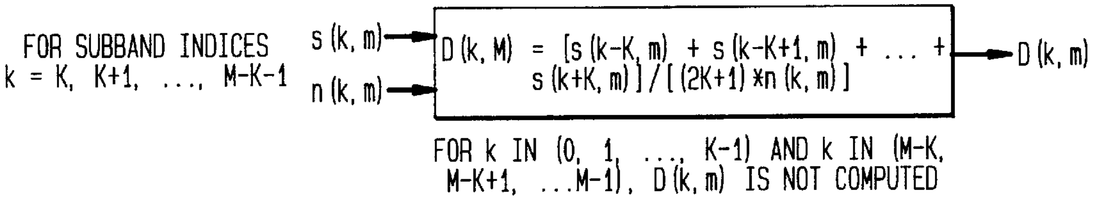
FIG. 7 is a more detailed, schematic representation of the broadband deflection stage of FIG. 2.

I have found that for detection of broadband energy, it is advantageous to combine, in a certain sense, the results of two or more narrowband deflection ratios. That is, a lumped broadband deflection coefficient is advantageously computed by taking an arithmetic average of 2K+1 narrowband deflection coefficients (K a positive integer) in a range of sub-bands centered about a given sub-band, each of these coefficients taken relative to the noise estimate in the given sub-band. Thus, as shown in FIG. 7, the broadband deflection coefficient D(k,m) is given by:

$$D(k,m)=[s(k-K,m)+s(k-K+1,m)+ \ldots +s(k+K,m)]/[(2K+1)\bullet n(k,m)].$$

It should be noted in this regard that D(k,m) cannot be evaluated for values of k less than K It should further be noted that M−1 is the maximum sub-band index. Thus, D(k,m) cannot be evaluated for values of k greater than M−K−1.

In a current implementation, the value of K is 2. Other values of K (including the unity value as well as values greater than 2) are readily chosen to provide optimal performance in specific applications.

I have found that the expression given above for D(k,m), in which the central sub-band noise estimate appears directly in the denominator, is generally preferable to an arithmetic average of 2K+1 distinct narrowband deflection coefficients. This is because, for some classes of broadband voice utterances, the frequency band edges of the utterance that are poorly represented by the narrowband deflection coefficient are better represented by a broadband deflection coefficient that incorporates only the signal estimate from bands neighboring those edges.

Other techniques can also be used to obtain a broadband deflection coefficient. For example, an alternate embodiment is readily implemented that includes a second sub-band filter architecture having broader sub-bands than that described above. (Such sub-bands may be referred to, e.g., as "auxiliary" sub-bands.) Broadband deflection coefficients are obtained by, e.g., a procedure analogous to the computation of d(k,m), but using this second filter architecture. This alternate approach has the advantage that noise energy at all frequencies outside the (relatively broad) band of interest is removed from the detection statistic (i.e., from the broadband deflection coefficient) by the broader-band sub-band filter itself. This is not generally true when an arithmetic averaging approach is used, because in that case, sub-band energies are combined incoherently. Thus, the broadband deflection can be made in some sense optimal by, e.g., defining the second sub-band filter architecture in accordance with well-known techniques of matched filtering. This alternate approach may be especially advantageous when K assumes relatively large values, such as values of 5 or more.

Figure 8A:
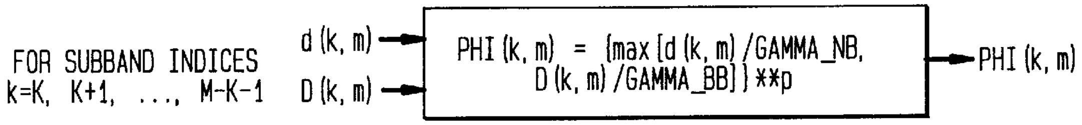
FIGS. 8A and 8B provide a more detailed, schematic representation of the lumped deflection stage of FIG. 2.
Figure 8B:
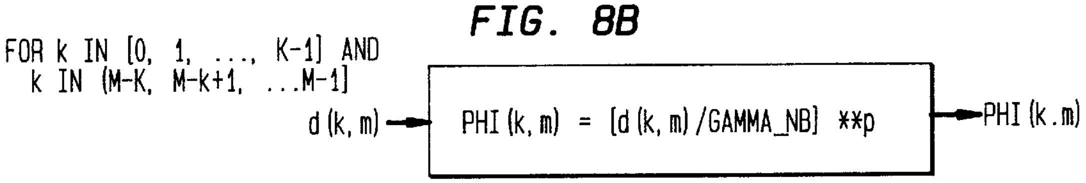

At each sub-band time index k, the narrowband and broadband deflection ratios are combined to yield a lumped deflection ratio PHI(k,m). The formula illustrated in FIG. 8A is to be used when k is at least K but not more than M−K−1. The formula illustrated in FIG. 8B is to be used when k is less than K, and when k lies in the inclusive range from M−K to M−1.

According to the first of these formulas, the narrowband and broadband deflection coefficients are each normalized to a respective threshold GAMMA_NB or GAMMA_BB. These thresholds represent the respective levels at which the deflection ratios are declared to indicate a certainty of speech energy. In a current implementation, both of these thresholds are set to 30.0.

The greater of the two normalized deflection coefficients determines the value of PHI(k,m). An expansion factor p controls the rate at which the lumped deflection ratio decays for deflection ratios less than unity. According to a current implementation, p is equal to unity, providing linear decay with the envelope of the sub-band signal energy. The first formula is expressed by:

$$PHI(k,m)=\{\max[d(k,m)/\text{GAMMA\_NB}, D(k,m)/\text{GAMMA\_BB}]\}^{**}p.$$

According to the second formula, the lumped deflection coefficient is determined by the narrowband deflection coefficient and the expansion factor. The second formula is expressed by:

$$PHI(k,m)=[d(k,m)/\text{GAMMA\_NB}]^{**}p.$$

Figure 9:
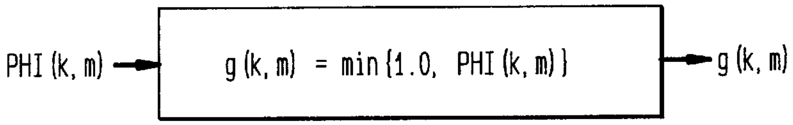
FIG. 9 is a more detailed, schematic representation of the gain computation stage of FIG. 2.

As shown in FIG. 9, the signal gain function g(k,m) is determined by PHI(k,m), but has an upper bound of unity. That is, $$g(k,m)=\min[1.0, PHI(k,m)].$$

Thus, each sub-band time series having a deflection of unity or less is passed to the synthesis filter bank with gain given by PHI(k,m), but each such series having a greater deflection is passed to the synthesis bank with unity gain.

Figure 10:
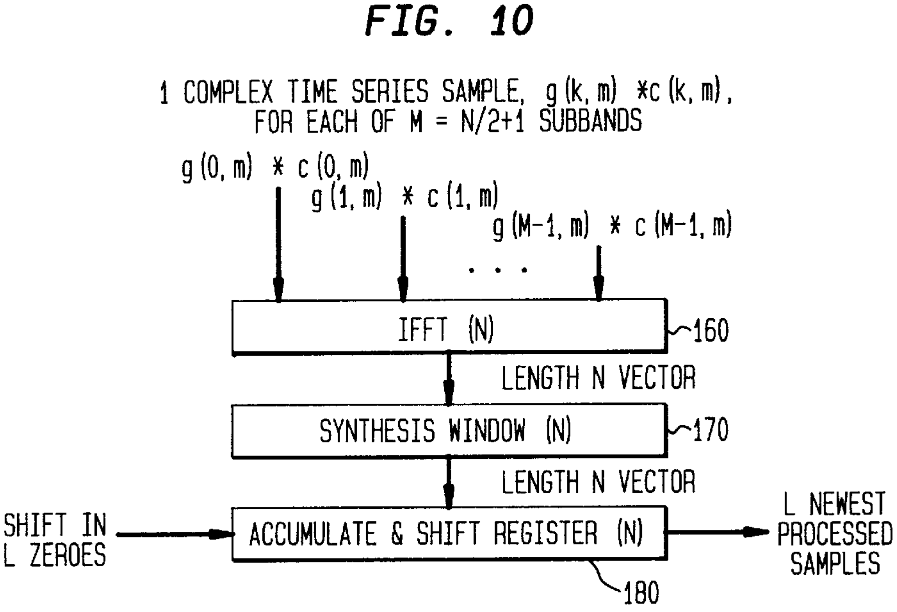
FIG. 10 is a more detailed, schematic representation of the sub-band synthesis stage of FIG. 2.

As shown in FIG. 10, the input to the sub-band synthesis stage (in each processing epoch of index m) includes one complex time-series sample g(k,m)•c(k,m) for each of the M sub-bands. These M samples are processed by inverse FFT 160 to produce an output vector of length N, as is well known in the art. This output vector is processed by synthesis window (of length N) 170, which is the counterpart, on the synthesis side, of analysis window 140. The output of synthesis window 170 is a further vector of length N. This vector is input to accumulator 180, which is the counterpart on the synthesis end of accumulator 130.

Input to accumulator 180 takes place in frames of length N. Output from accumulator 180 takes place in blocks of length L. Data are transferred to the accumulator in an overlap-and-add operation. In such an operation, the new (processed) samples are added to the previous values stored in corresponding cells of the accumulator. When L samples are shifted out of the output end of the accumulator, a sequence of L zeroes is inserted at the input end. The output of accumulator 180 corresponds to the noise-reduced speech, y(n).

It will be appreciated that the inventive method involves a modest number of adjustable parameters. Although at least some of these will typically be set in the factory, others can optionally be set in the field, either manually by the user or automatically. Exemplary field-settable parameters may include, among others, the bandwidth 2K+1 for broadband speech detection, the expansion coefficient p, and the respective speech thresholds GAMMA_NB and GAMMA_BB.

In one illustrative scenario, a user of a telephone desires to improve the intelligibility of far-in speech; that is, of speech that is received from a remote location. Manual controls are readily provided so that such a user can select those values of the field-settable parameters that afford the greatest speech intelligibility as perceived by that user.

In a second illustrative scenario, a communication device, personal computer, or a consumer electronic appliance is intended to operate in response to a device for automatic speech recognition (ASR). Background noise contaminates the user's voice, and renders it less intelligible to the ASR device. In such a case, it is advantageous to provide automatic adjustment of field-settable parameters. Those skilled in the art will recognize that various techniques are available for such automatic adjustment. These include, e.g., techniques using neural networks, as well as techniques using adaptive algorithms. Appropriate such algorithms are well-known in the art. They may be based, for example, on methods of statistical sampling, model fitting, or template matching.

The implementation of many of these techniques will typically involve repetitions of vocal input to the ASR device. During these repetitions, in accordance with a training or adaptation phase, the adjustable parameter values converge toward a set of values that affords improved speech intelligibility. The vocal repetitions can be provided by the user or, in at least some cases, by stored or simulated speech signals.

It will be understood that these scenarios are provided for illustrative purposes only. Those skilled in the art will recognize numerous other applications for the methods and apparatus described here, all of which lie within the scope and spirit of the invention.

What is claimed is:

1. A method for enhancing, within a signal bandwidth, a corrupted audio-frequency signal having a signal component and a noise component, the method comprising:

analyzing the corrupted signal into plural sub-band signals, each occupying a frequency sub-band smaller than the signal bandwidth;

applying a respective signal gain function to the sub-band signal corresponding to each sub-band, thereby to yield respective gain-modified signals; and synthesizing the gain-modified signals into an enhanced signal of the signal bandwidth; wherein:

(a) within each frequency sub-band, the step of applying a respective signal gain function to a corresponding sub-band signal comprises evaluating a function that is preferentially sensitive to energy in the signal component;

(b) within each frequency sub-band, said applying step further comprises applying gain values to the corresponding sub-band signal, wherein said gain values are related to said preferentially sensitive function; and (c) the step of evaluating the preferentially sensitive function comprises measuring a relative amount of speech energy within the corresponding sub-band, and measuring a relative amount of speech energy within a frequency range greater than, but centered on, the corresponding sub-band.

2. The method of claim 1, wherein, in each sub-band, the step of measuring a relative amount of speech energy within a frequency range greater than the corresponding sub-band comprises measuring speech energy in a plurality of sub-bands.

3. The method of claim 1, wherein:

the method further comprises analyzing the corrupted signal into plural auxiliary signals occupying auxiliary bands broader than the sub-bands; and in each sub-band, the step of measuring a relative amount of speech energy within a frequency range greater than the corresponding sub-band comprises measuring speech energy in at least one auxiliary band.

4. The method of claim 1, wherein, within each sub-band:

the step of measuring a relative amount of speech energy within said sub-band comprises measuring a ratio, to be referred to as a narrowband deflection, of estimated speech energy to estimated noise energy within said sub-band; and the step of measuring a relative amount of speech energy within a frequency range greater than, but centered on, said sub-band comprises measuring a ratio, to be referred to as a broadband deflection, of estimated speech energy to estimated noise energy within a frequency range greater than and centered on said sub-band.

5. The method of claim 4, wherein, within each given sub-band, the step of measuring the broadband defection comprises:

taking the arithmetic average of an estimated signal level over a plurality of sub-bands; and taking the ratio of said arithmetic average to an estimated noise level in the given sub-band.

6. The method of claim 4, wherein the step of evaluating the preferentially sensitive function further comprises normalizing the narrowband deflection to a narrowband threshold and normalizing the broadband deflection to a broadband threshold.

7. The method of claim 6, wherein the step of evaluating the preferentially sensitive function further comprises choosing the greater of the normalized narrowband deflection and the normalized broadband deflection, thereby to yield a lumped deflection.

8. The method of claim 7, wherein the preferentially sensitive function is equal to the lumped deflection when the value of the lumped defection is less than or equal to 1, and the preferentially sensitive function is equal to 1 when the value of the lumped deflection is greater than 1.

9. The method of claim 6, wherein the step of evaluating the preferentially sensitive function further comprises choosing the greater of the normalized narrowband deflection and the normalized broadband deflection, and raising the chosen normalized deflection to a power p, wherein p is a real number.

10. The method of claim 9, wherein the preferentially sensitive function is equal to a quantity, obtained by raising the chosen normalized deflection to the power p, when said quantity is less than or equal to 1, and the preferentially sensitive function is equal to 1 when said quantity is greater than 1.

11. A method for enhancing, within a signal bandwidth, a corrupted audio-frequency signal having a signal component and a noise component, the method comprising:

analyzing the corrupted signal into plural sub-band signals, each occupying a frequency sub-band smaller than the signal bandwidth;

applying a respective signal gain function to the sub-band signal corresponding to each sub-band, thereby to yield respective gain-modified signals; and synthesizing the gain-modified signals into an enhanced signal of the signal bandwidth, wherein:

(a) within each frequency sub-band, the step of applying a respective signal gain function to a corresponding sub-band signal comprises evaluating a function that is preferentially sensitive to energy in the signal component;

(b) within each frequency sub-band, the step of applying further comprises applying gain values to the corresponding sub-band signal, wherein the gain values are related to the preferentially sensitive function;

(c) the step of evaluating the preferentially sensitive function comprises:

measuring speech energy; and measuring noise energy within the corresponding sub-band;

(d) the step of measuring noise energy comprises evaluating a noise estimate in response to a recursive function of a sampled sub-band input is updated if a test is satisfied at sampled intervals (e) such that an update of a current noise estimate is generated if a new sample of the corrupted signal is less than a product of a multiplier and the current noise estimate, and is prevented if the new sample exceeds the product.

12. A method for enhancing, within a signal bandwidth, a corrupted audio-frequency signal having a signal component and a noise component, the method comprising:

analyzing the corrupted signal into plural sub-band signals, each occupying a frequency sub-band smaller than the signal bandwidth;

applying a respective signal gain function to the sub-band signal corresponding to each sub-band, thereby to yield respective gain-modified signals; and synthesizing the gain-modified signals into an enhanced signal of the signal bandwidth, wherein:

(a) within each frequency sub-band, the step of applying a respective signal gain function to a corresponding sub-band signal comprises evaluating a function that is preferentially sensitive to energy in the signal component;

(b) within each frequency sub-band, the step of applying further comprises applying gain values to the corresponding sub-band signal, wherein the gain values are related to the preferentially sensitive function;

(c) the step of evaluating the preferentially sensitive function comprises:

measuring speech energy; and measuring noise energy within the corresponding sub-band;

(d) the step of measuring noise energy comprises evaluating a noise estimate in response to a recursive function that is updated at least at sample intervals;

(e) the value of the noise estimate is limited by an upper bound that is matched to the dynamic range of the corrupted signal to be enhanced; and (f) the gain values are derived from one or more ratios of a sub-band signal estimate to a sub-band signal noise estimate.

* * * * *